F. C. BALMERT.
WEIGHING MACHINE.
APPLICATION FILED NOV. 27, 1916.
1,235,000.
Patented July 31, 1917.
2 SHEETS—SHEET 2.
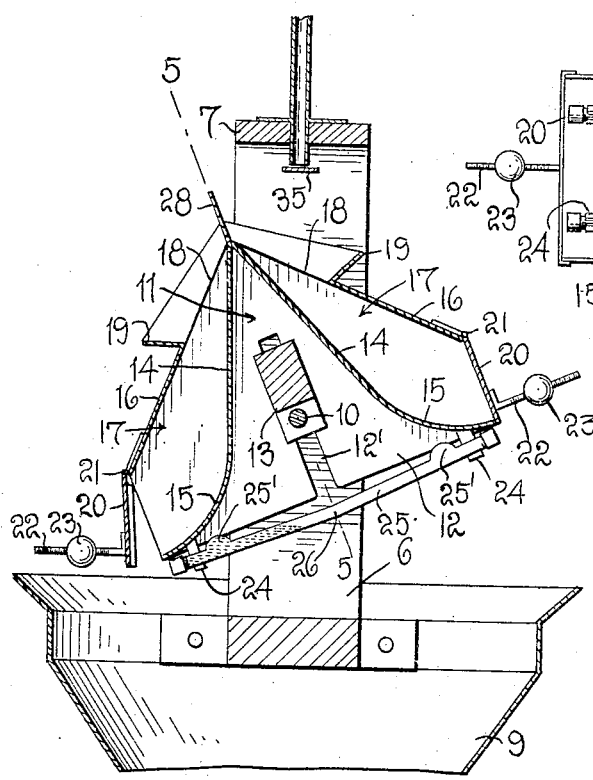
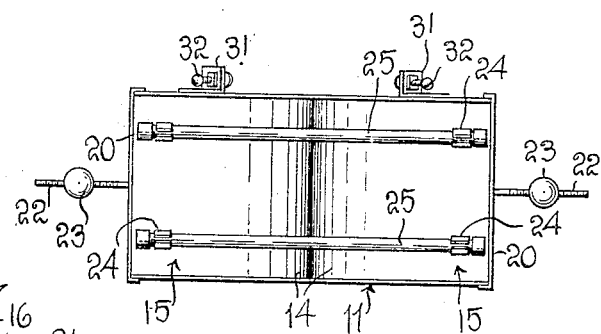
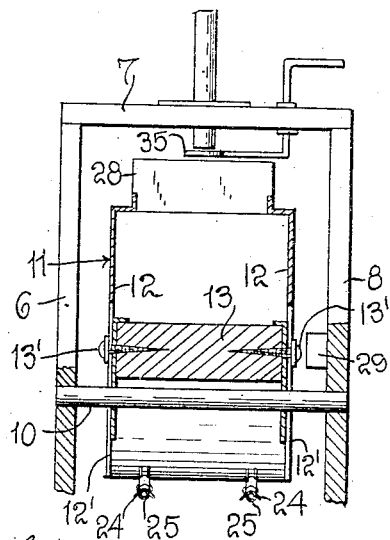
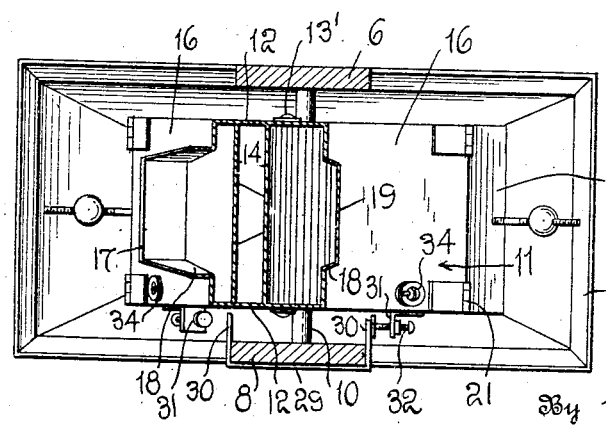
Inventor
F. C. BALMERT
By Watson E. Coleman
Attorney

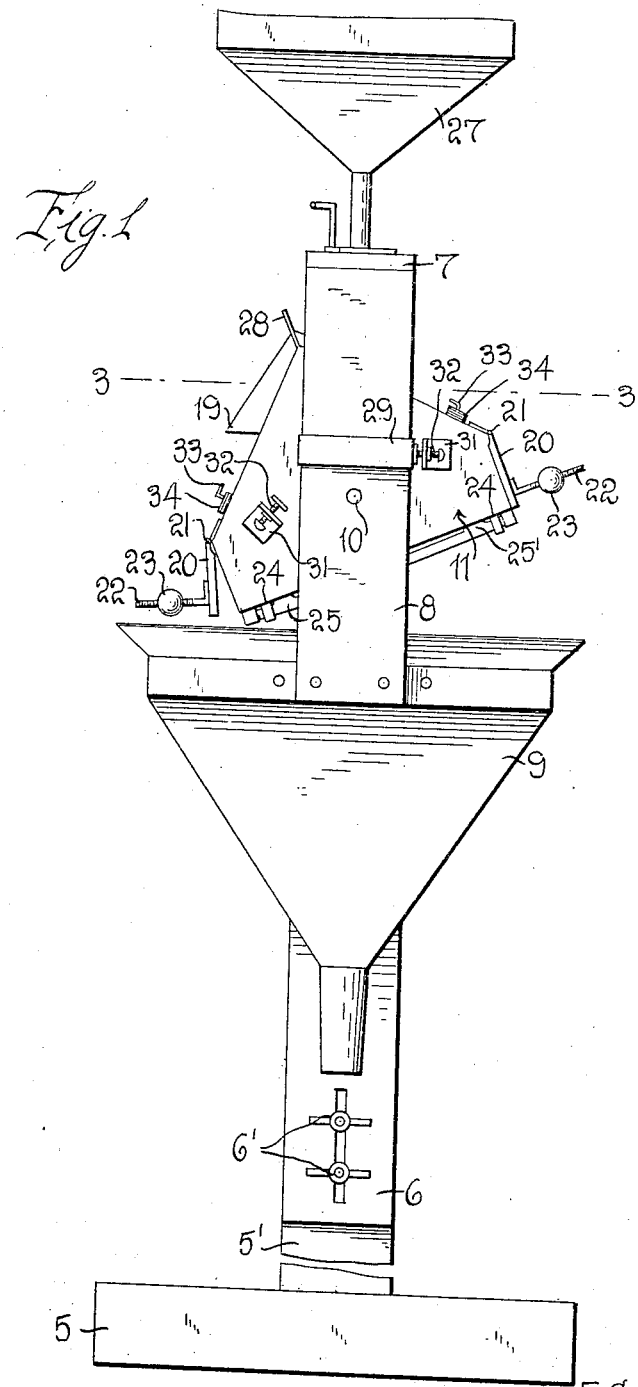

UNITED STATES PATENT OFFICE.

FRANK C. BALMERT, OF PORTSMOUTH, OHIO.

WEIGHING-MACHINE.

1,235,000.  Specification of Letters Patent.  Patented July 31, 1917.

Application filed November 27, 1916. Serial No. 133,697.

*To all whom it may concern:*

Be it known that I, FRANK C. BALMERT, a citizen of the United States, residing at Portsmouth, in the county of Scioto and State of Ohio, have invented certain new and useful Improvements in Weighing-Machines, of which the following is a specification, reference being had to the accompanying drawings.

This invention relates to an improved weighing machine and has for its primary object to provide a very simply constructed apparatus for weighing grain and other commodities in comminuted form, in predetermined uniform quantities.

It is another and more particular object of the invention to provide a machine for the above purpose embodying a pivotally mounted, double-chambered weighing hopper, a common receiving and discharge hopper mounted beneath the weighing hopper, and one or more detachable tubes mounted upon the under side of the weighing hopper and containing a suitable counterbalancing medium movable in the tubes.

It is a further general object of my invention to provide an apparatus for the above purpose which is very reliable and efficient in its operation, as well as highly serviceable and convenient in practical use and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a side elevation of an automatic weighing machine constructed in accordance with one embodiment of my invention;

Fig. 2 is a vertical sectional view through the weighing hopper;

Fig. 3 is a horizontal section taken on the line 3—3 of Fig. 1;

Fig. 4 is a bottom plan view of the weighing hopper; and

Fig. 5 is an enlarged vertical section through one side of the hopper, taken on the line 5—5 of Fig. 2.

Referring in detail to the drawings, 5 designates a suitable base upon which the lower section 5' of an upright is suitably fixed. The section 6 of this upright is vertically adjustable with respect to the section 5' and the weighing mechanism to be hereinafter referred to, is mounted upon the latter section of the upright. This upright section 6 is provided with a slot in its lower end to receive one or more clamping bolts 6' mounted in the fixed section 5' of the upright. Thus, the upright section 6 can be vertically adjusted, as may be desired. A horizontal bar 7 connects the upper end of said upright to a relatively short, vertical bar 8 disposed in spaced relation to the upright 6. The upper end of a receiving and discharge hopper 9 is suitably secured between the lower end of the bar 8 and the upright 6.

The ends of the shaft 10 are suitably secured in the upright 6 and bar 8 respectively, and upon the same the weighing hopper 11 is oscillatably mounted. This hopper is preferably adjustable so that the center of gravity of the same may be varied. To this end, the side walls 12 of the hopper are provided with vertical slots 12'. The bearing 13 extends between the side walls of the hopper and is loosely mounted at its ends upon the shaft 10. Screws 13', disposed through the slots 12', are threaded in the ends of this bearing, and washers are interposed between the screw heads and the hopper walls 12. It will thus be understood that, by loosening said screws, the hopper can be vertically adjusted with respect to the bearing and then securely clamped in its adjusted position. One side wall of the hopper is preferably provided with a graduated scale contiguous to the slot 12' so that the vertical adjustment of the hopper may be accurately determined.

The side walls of the hopper are of substantially triangular-shaped form and from the apex thereof an inclined connecting plate 14 extends downwardly toward each end of the hopper, the lower end portion of said plate being laterally curved, as indicated at 15. The space between each of these inclined plates and the opposed inclined top wall 16 of the hopper forms a material receiving compartment 17. The upper end portion of the top wall 16 is cut away, as indicated at 18, to provide an entrance opening for the material, and at the lower end and each side of said entrance opening an outwardly and angularly projecting flange 19 is provided, which serves as a deflecting guard to direct the material into and through said entrance opening, Each of the compartments 17 is provided with a door 20 hinged, as at 21, at its upper edge to the lower edge of the top wall 16. To the free edge of the door, a depending, threaded rod 22 is fixed at one end, upon which a weight 23 may be removably engaged.

Upon the under side of the curved end 15 of the inclined partition wall 14, spaced hanger clips 24 are secured, and in these clips one or more tubes 25, preferably of glass, may be detachably mounted. Each of the tubes contains a quantity of mercury or other suitable fluid balancing medium, and these tubes are bent, as at 26, so that the end portions extend at a slight inclination from the center of the tube. Each of these tubes is preferably provided adjacent its ends, with an enlargement or pocket, indicated at 25', which is adapted to receive the mercury contained in the tube so that in case a large amount of mercury or other liquid is contained in the tube, the whole thereof may be entirely contained in the tube at one side of its center. The ends of these tubes are threaded to receive detachable, metal caps. While I have indicated spring clips for detachably supporting the mercury tubes in the accompanying drawing, it is to be understood that various other means of attachment may be substituted for these clips.

In the horizontal top bar 7 of the supporting frame, the spout or tube of a feed hopper 27 is suitably mounted, and to the apex of the double-chambered weighing hopper, a vertically disposed blade 28 is secured. A cut-off plate 35 is movably mounted upon the frame bar 7 and is adapted to be moved to position beneath the discharge spout of the feed hopper 27 to cut off the feed of the material. To the vertical bar 8, a metal strap 29 is fixed, the extremities of said strap being angularly extended inwardly toward the side wall of the oscillatable weighing hopper, as at 30. The lugs 31 are secured to one side wall of the hopper, and in each of the lugs a stop screw 32 is adjustably threaded and adapted to contact with the respective ends of the metal strap 29 to limit the oscillating movement of the hopper in each direction. Hooks or elements, indicated at 33, are fixed to each of the inclined top walls 16 of the oscillating hopper to receive one or more small weights 34. These weights are employed when the mercury tubes are not used and also for properly adjusting the balance of the hopper so that equal quantities will be weighed in both hopper chambers.

In the operation of the apparatus, when the grain or other comminuted material is poured into the hopper 27, it falls by gravity through the hopper into one of the chambers 17 of the weighing hopper 11. The mercury in the tube or tubes 26 is, of course, disposed in the lowermost ends of said tubes and on the opposite side of the shaft 10 with respect to the hopper chamber which is to be filled. This mercury or other weighting medium, together with the lower side of the hopper, overbalances the opposite side of the hopper until a sufficient quantity of the material has been fed into the hopper chamber 17 on the latter side thereof, when the hopper will oscillate on the shaft 10 and the filled side thereof will move downwardly. In this downward movement, the door of the filled chamber swings open by reason of the gravity movement of the weight 23 so that the material will be discharged into the lower fixed hopper 9 from which it is finally discharged into a suitable receptacle arranged upon the base 5. In this oscillating movement of the weighing hopper, the vertical, metal blade 28 at the apex of the hopper, sharply cuts off the supply of the material to the filled chamber and also prevents the same being scattered by contact with the ridge of the hopper, said blade also acting, as it moves to one side of the center of gravity, to direct the falling grain into the entrance opening of the other hopper chamber 17 as the latter moves to position to be filled. In this manner, it will be understood that the material is accurately weighed in uniform quantities by the automatic oscillating movement of the double-chambered hopper. The apparatus is very serviceable and efficient in its operation when employed for the weighing of grain or similar comminuted products. It is apparent, of course, that the hopper chambers may be of any desired capacity. A number of mercury containing tubes of various sizes may also be provided so that the oscillating hopper will be properly balanced in accordance with the desired quantity of material to be weighed in each operation thereof.

From the foregoing description, taken in connection with the accompanying drawing, the construction, manner of operation and several advantages of my invention will be clearly and fully understood. The mechanism being exceedingly simple is not liable to get out of order and may also be manufactured at relatively small cost.

While I have shown and described the preferred form and construction of the several elements, it is to be understood that the apparatus is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:—

1. In an automatic weighing apparatus, an oscillatable bearing, a hopper supported upon said bearing and having a chamber on each side thereof, means for vertically adjusting the hopper with respect to the bearing, and a movable weighting medium carried by the hopper and movable alternately to opposite sides of its center of gravity.

2. In an automatic weighing apparatus, an oscillatable bearing, a hopper supported upon said bearing and having a material receiving chamber on each side thereof, each of the side walls of the hopper being provided with a slot, clamping screws disposed through said slots and threaded in the bearing to secure the hopper in a vertically adjusted position with respect to the bearing, and a weighting medium carried by the hopper and alternately movable to opposite sides of its center of gravity.

In testimony whereof I hereunto affix my signature in the presence of two witnesses.

FRANK C. BALMERT.

Witnesses:
GARNETTE N. MILLER,
ETHEL C. BLUM.

Copies of this patent may be obtained for five cents each, by addressing the "Commissioner of Patents, Washington, D. C."